INVENTOR
Henry O. Klinke
BY
ATTORNEYS

Patented Aug. 30, 1949

2,480,299

UNITED STATES PATENT OFFICE 2,480,299

APPARATUS FOR BUTT WELDING WITH INDUCTION HEATING

Henry O. Klinke, Forest Hills, N. Y., assignor to Air Reduction Company, Incorporated, a corporation of New York Application May 16, 1946, Serial No. 670,197

5 Claims. (Cl. 219—4)

This invention relates to apparatus for electrically butt welding metal objects such as bars, rods, pipes, tubes, etc.

One object of the invention is to provide improved welding apparatus by which a method of electric butt welding can be carried out in which high frequency induction heating of the surfaces to be welded is supplemented by relatively inexpensive induction heating of the end portions of the objects back of the surfaces to prevent quenching of the metal at the welded joint by adjacent cold metal.

Another object is to provide improved welding apparatus particularly adapted for use in butt welding metal objects by the employment of electric induction heating and in the presence of a protective atmosphere of inert gas.

Welding apparatus embodying the invention is illustrated in the accompanying drawing, in which.

Figure 1:
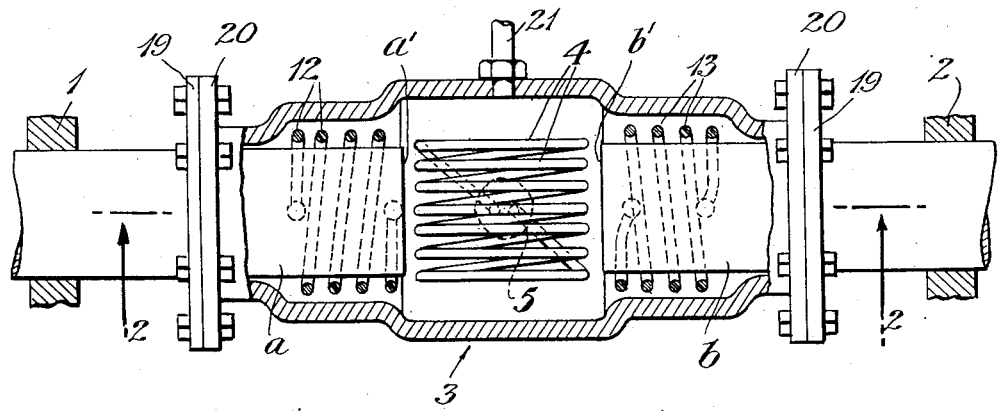
Figure 1 is a plan view, partly in horizontal section, of the apparatus.

The parts to be welded are represented at $a$ and $b$. These may be the end portions of two bars, rods, tubes, pipes, or other objects whose end faces $a'$ and $b'$ are to be joined by butt welding. The parts $a$ and $b$ are mounted in any known type of apparatus which is capable of holding them in alignment with their end faces in confronting spaced relation during the heating operation and then moving the parts toward each other to bring the end faces together under pressure and effect the weld. The members shown at 1 and 2 in Fig. 1 represent clamping rings forming part of apparatus of this type that are adapted to engage the parts $a$ and $b$ and move them together under pressure to effect the weld between the end faces after they have been heated to welding temperature.

Figure 2:
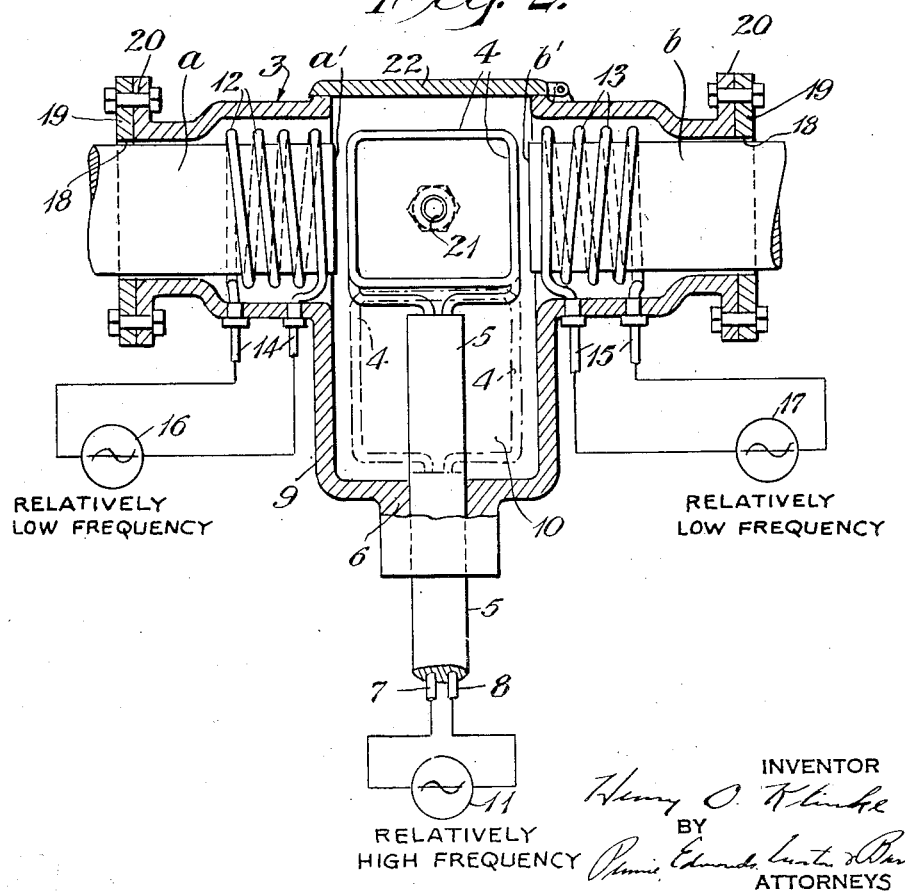
Fig. 2 is a vertical section taken on the line 2—2 of Fig. 1.

The end portions of the parts $a$ and $b$ are enclosed by a housing 3 with respect to which the parts can slide when they are brought together to effect the weld. Within the housing there is an electric induction coil 4 which is carried by a support 5 that is slidably mounted in a bearing 6 formed on a wall of the housing (Fig. 2). The coil 4 has power leads 7 and 8 which extend through the support 5. In one position of the support 5 the induction coil 4 lies in the space between the end faces $a'$ and $b'$ of the parts to be welded. When the support 5 is retracted the induction coil 4 is withdrawn from its position between the end faces $a'$ and $b'$ and occupies an inoperative position indicated by dotted lines in Fig. 2. The housing 3 has an extension 9 which provides a recess 10 to accommodate the coil 4 when moved to its inoperative dotted line position. The induction coil 4 is adapted to be energized from a source of high frequency alternating current represented at 11 and to which the leads 7 and 8 are connected.

Also, within the housing 3 there are two induction coils 12 and 13 each of which is adapted to surround the end portion of one of the parts to be welded. Power leads 14 and 15 for the coils 12 and 13, respectively, extend through insulators in the wall of the housing (Fig. 2). The coils 12 and 13 are adapted to be energized from a single source of a relatively low frequency alternating current, or from two such sources represented at 16 and 17 in Fig. 2 to which the leads 14 and 15 are connected respectively.

The parts $a$ and $b$ extend into the housing through openings 18 in end plates 19 (Fig. 2) which are bolted to flanges 20 on the housing. The openings 18 have a shape corresponding to the cross-sectional shape of the parts to be welded and have a size such that the parts have a sliding fit in them. In the drawing the parts to be welded are shown as being of the maximum size that can be welded in the particular apparatus illustrated. When the apparatus is to be used for welding smaller work-pieces, the end plates 19 are replaced with similar plates having openings of a size and shape to fit the particular work-pieces to be welded.

Inert gas may be admitted to the interior of the housing 3 through an inlet pipe 21 (Fig. 1). The housing is provided with a door 22 (Fig. 2) which provides access to the interior of the housing for inspection and removal of the induction coils.

After the parts to be welded are positioned as shown in the drawing, inert gas is admitted to the housing and the induction coil 4 is moved into the space between the confronting faces $a'$ and $b'$ of the parts to be welded. The coil 4 is then energized by high frequency alternating current from the source 11, and the coils 12 and 13 are energized by relatively low frequency alternating current from the sources 16 and 17 or from their single source. The coil 4 is adapted, when energized by the high frequency alternating current passing through it, to inductively heat the end faces $a'$ and $b'$ of the parts to be welded to welding temperature. The coils 16 and 17 are adapted, when energized by the relatively low frequency alternating current, to heat the metal back of the end faces by induction. When the end faces $a'$ and $b'$ have been heated to welding temperature the high frequency coil 4 is withdrawn into the recess 10 in the housing so that it no longer lies in the space between the end faces to be welded. The parts are then moved by the clamping rings 1 and 2 to bring the heated faces $a'$ and $b'$ together under pressure to effect the weld.

The high frequency induction coil 4, when in the space between the end faces of the work-pieces, is preferably positioned with its axis extending in a direction parallel to the faces as shown in the drawing. In this position, the coil produces a flux field which will heat the end faces more advantageously, the heat produced by the flux being largely confined to the end faces of the work-pieces.

The heating of the metal back of the end faces of the parts $a$ and $b$ prevents large conduction losses from the end faces which are highly heated by the high frequency induction coil 4. It also prevents self-quenching of the metal at the welded joint such as might be caused by the presence of cold metal adjacent the joint. If the end portions of the parts were not heated, the induction coil 4 would produce such a steep temperature gradient when welding certain kinds of steel that the self-quenching might be sufficient to cause the weld to be brittle. The heating coils 12 and 13 permit a control of the temperature gradient and make subsequent heat treatment of the welded joint unnecessary. Since the supplemental heating is accomplished by the use of relatively low frequency alternating current, the invention reduces to a minimum the amount of apparatus required to produce high frequency power with a consequent reduction in the expense of the equipment.

While the current for energizing the induction coils 12 and 13 has been referred to as a relatively low frequency alternating current, it should of course be high enough in frequency to inductively heat the end portions of the parts to be welded to a temperature sufficiently high to prevent the self-quenching action above referred to. In most cases a frequency of around 60 cycles will be found to be suitable, which, of course, is relatively low in comparison with a frequency of from 960 to 9600 cycles, which is appropriate for the alternating current supplied to the high frequency induction coil 4.

The apparatus herein described is well suited for butt welding metal parts under a protective atmosphere of inert gas to prevent oxidation of the surfaces while they are being heated and while they are being brought together to effect the weld, this being the purpose of the inert gas admitted to the housing 3 through the inlet pipe 21.

I claim:

1. In apparatus for butt welding metal objects, means for holding the objects with their surfaces to be welded in confronting spaced relation, a housing enclosing the adjacent end portions of the objects, an induction coil support slidably mounted in the wall of the housing, and an induction coil carried by said support within the housing and movable into and out of the space between the confronting surfaces of the objects by sliding said support and adapted when it is in said space and when energized by a high frequency alternating current to inductively heat said surfaces to welding temperature, said housing having a recess adapted to accommodate said coil when it is moved by its support out of the space between said confronting surfaces.

2. In apparatus for butt welding metal objects, means for holding the objects with their surfaces to be welded in confronting spaced relation, a housing adapted to enclose the adjacent end portions of the objects, an induction coil support slidably mounted in the wall of the housing, an induction coil carried by said support within the housing and movable into and out of the space between the confronting surfaces of the objects by sliding the support and adapted when it is in said space and when energized by a high frequency alternating current to inductively heat said surfaces to welding temperature, coils stationarily mounted within the housing in coaxial and spaced relation adapted to surround the end portions of the objects and to inductively heat them when the coils are energized by relatively low frequency alternating current, and a door associated with the housing providing access to its interior for inspection and removal of all of the coils.

3. In apparatus for butt welding metal objects, means for holding the objects with their surfaces to be welded in confronting spaced relation, a slidably mounted induction coil support, an induction coil carried by said support within the housing and movable into and out of the space between said surfaces by sliding said support and adapted when in such space to be positioned so that its axis is substantially parallel to the confronting faces of the objects, said coil being further adapted when energized by a high frequency alternating current to inductively heat the surfaces to welding temperature, and coils in coaxial and spaced relation adapted to surround the end portions of the objects back of the surfaces to be welded and to inductively heat said end portions when the coils are energized by relatively low frequency alternating current.

4. In apparatus for butt welding metal objects, means for holding the objects with their surfaces to be welded in confronting spaced relation, a housing enclosing the adjacent end portions of the objects, coils mounted within said housing in coaxial and spaced relation and adapted to surround the end portions of the objects back of the surfaces to be welded and to inductively heat said end portions when the coils are energized by relatively low frequency alternating current, an induction coil support slidably mounted in the wall of the housing, and an induction coil carried by said support within the housing and movable into and out of the space between the confronting surfaces of the objects by sliding the support and adapted when it is in said space and when energized by a high frequency alternating current to inductively heat said surfaces to welding temperature, said housing having a recess adapted to accommodate said last-named coil when it is moved by its support out of the space between said confronting surfaces.

5. In apparatus for butt welding metal objects, means for holding the objects with their end surfaces to be welded in confronting spaced relation, a housing enclosing the adjacent end portions of the objects, stationary coils mounted within said housing in coaxial and spaced relation and adapted to surround the end portions of the objects back of the surfaces to be welded and to inductively heat said end portions when the coils are energized by relatively low frequency alternating current, an induction coil support slidably mounted in the wall of the housing and an induction welding coil carried by said support within the housing and movable into and out of the space between the confronting surfaces of the objects by sliding the support and adapted when it is in said space and when energized by a high frequency alternating current to inductively heat said surfaces to welding temperatures, said housing having a recess adapted to accommodate said welding coil when it is moved by its support out of the space between said confronting surfaces, the housing having openings through which the end portions of the objects may project into the housing and which permit the objects to slide relative to the housing so that their end surfaces can be brought together in abutting relation after said welding coil is moved into said recess in the housing, and said stationary coils in the housing being adapted to allow the objects to slide through them.

HENRY O. KLINKE.

REFERENCES CITED

The following references are of record in the file of this patent:

UNITED STATES PATENTS

| Number | Name | Date |
| --- | --- | --- |
| 1,809,468 | Bornand et al. | June 9, 1931 |
| 2,024,906 | Bennett | Dec. 17, 1935 |
| 2,092,003 | Mitchell | Sept. 7, 1937 |
| 2,184,534 | Smith et al. | Dec. 26, 1939 |

OTHER REFERENCES

Jordan: "The theory and practice of industrial electronic heating," General Electric Review, December 1943, pages 675–683, particularly pages 679 and 680.